United States Patent
Yeh et al.

(10) Patent No.: US 8,059,699 B2
(45) Date of Patent: Nov. 15, 2011

(54) LOW POWER CONSUMPTION GNSS RECEIVER AND METHOD THEREOF

(75) Inventors: Hsin-chung Yeh, Hsinchu (TW);
Ming-hung Lee, Yonghe (TW);
Zong-hua You, Hsin-Chu (TW)

(73) Assignee: Mediatek Inc., Hsin-Chu (TW)

( * ) Notice: Subject to any disclaimer, the term of this patent is extended or adjusted under 35 U.S.C. 154(b) by 1126 days.

(21) Appl. No.: 11/747,736

(22) Filed: May 11, 2007

(65) Prior Publication Data
US 2008/0279260 A1    Nov. 13, 2008

(51) Int. Cl.
*H04B 1/00* (2006.01)
(52) U.S. Cl. ........ 375/150; 375/134; 375/142; 375/145; 375/149; 375/343
(58) Field of Classification Search ............... 375/142, 375/150, 343, 134, 145, 149
See application file for complete search history.

(56) References Cited

U.S. PATENT DOCUMENTS

| 5,592,173 | A | 1/1997 | Lau et al. |
| 6,662,107 | B2 | 12/2003 | Gronemeyer |
| 7,375,682 | B1 * | 5/2008 | Tester et al. ............... 342/357.06 |
| 2003/0147457 | A1 * | 8/2003 | King et al. .................... 375/148 |
| 2007/0247356 | A1 * | 10/2007 | Chen ......................... 342/357.06 |

* cited by examiner

*Primary Examiner* — Curtis Odom

(57) ABSTRACT

Disclosed is a low power consumption GNSS receiver by adaptively adjusting clock frequency. A correlator performs correlations to signals received from the channels with a correlator clock frequency. A DSP controls the correlator clock frequency according to a correlator load to performing correlations. The DSP calculates and adjusts code phases and Doppler frequencies for the signals in turn with a DSP clock frequency. The DSP controls the DSP clock frequency according to an accumulated throughput of calculation and adjustment or a predetermined threshold number of channels. The DSP controls the RF power according to the correlator load. A microprocessor processes a measurement result of the calculation and the adjustment for obtaining position information with a microprocessor clock frequency. The microprocessor controls the microprocessor clock frequency according to an accumulated progress of processing the measurement result. Accordingly, reducing power consumption for the GNSS receiver can be realized.

10 Claims, 11 Drawing Sheets

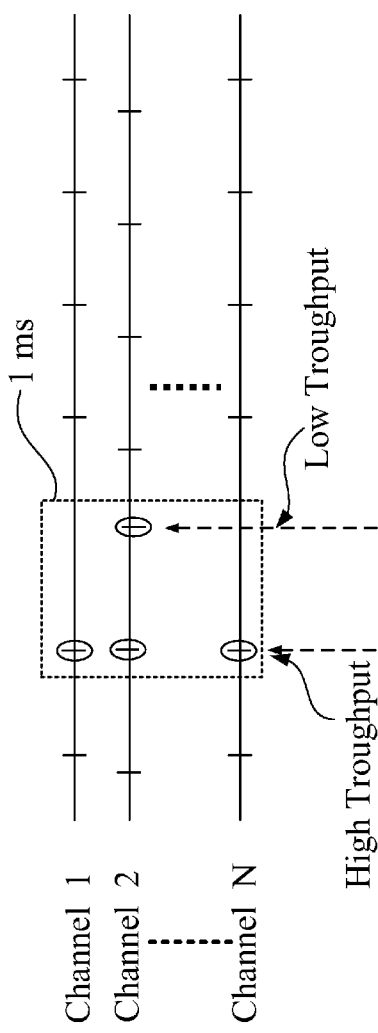
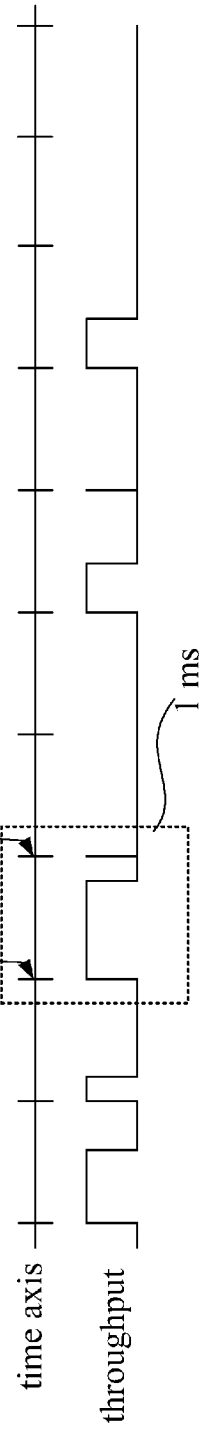
FIG. 2A
FIG. 2B

LOW POWER CONSUMPTION GNSS RECEIVER AND METHOD THEREOF

FIELD OF THE INVENTION

The present invention generally relates to a low power consumption GNSS receiver and more particularly, to a low power consumption GNSS receiver by adaptively adjusting the clock frequencies and method thereof.

BACKGROUND OF THE INVENTION

Nowadays, a commercial GNSS receiver has become a popular device, a small, portable size and convenient for use. Such portable GNSS receiver must utilize a battery as a power supply thereof. Due to the limited charging capacity of generic batteries, reducing power consumption of the portable GNSS receiver for advancement of long running-time is a great topic for research and development of the commercial GNSS receiver.

A GNSS receiver usually comprises two main units or two software partitions those include a measure engine and a navigation engine. For example, the measure engine may comprise correlators and a DSP (Digital Signal Processor). The correlators perform correlations to signals from channels for searching and tracking respective satellites. The DSP calculates and adjusts code phases and Doppler frequencies for the signals received from the channels in turn and decodes data for the channels as well. Specifically, the calculations and adjustments of the DSP for all the channels have to be completely done in 1 millisecond and a measurement result of code chips, the code phase sand the Doppler frequencies is transmitted to the navigation engine usually in 1 second for a calculation of a GNSS user's position, velocity and time information. A microprocessor of a standalone solution or a host CPU in many host based application will be in charge of that calculation of the GNSS user's position, velocity and time information.

A clock generator generates a reference clock for an RF unit and a synthesizer of the GNSS receiver. The synthesizer receives the reference clock and provides a correlator clock for the correlator, a DSP clock for the DSP and a microprocessor clock for the microprocessor, respectively. The DSP controls the correlator clock and the DSP clock. The microprocessor controls the microprocessor clock.

According to prior arts, the GNSS receiver continuously receives signals from all channels. The correlator performs correlations to the signals from the all channels and the DSP calculates and adjusts code phases and Doppler frequencies for the signals from the all channels in turn. When the GNSS receiver performs searching and tracking of specific number of satellites, the power consumption of the GNSS receiver remains the same, no matter the size of search range of a lost satellite or signal strength variations of the satellites due to different channel blocking or channel fading. In some circumstances of the prior art, the correlator may stop performing correlations to some signals for any reason during aforesaid searching and tracking. Therefore, the number of channels that are actually in use may change, but all the hardware related clock frequencies (the correlator clock frequency, the DSP clock frequency and the microprocessor clock frequency) always keep the same during GNSS receiver operation.

However, the power consumption is proportional to the correlator clock frequency, the DSP clock frequency, and the microprocessor clock frequency. Keeping all clock frequencies the same without considering the variations will result in the power consumption of the GNSS receiver be reduced inefficiently.

According to prior arts, stopping or freezing aforesaid clock frequencies is necessary for the GNSS receiver for reducing power consumption by a user command or according to a correlator load of performing correlation. Consequently, Such as a drawback that the GNSS receiver can't work well under a big dynamic operation condition, for example, a sudden acceleration or deceleration or a drawback that a sudden channel fading or a channel blocking suddenly degrades performance of the GNSS receiver seriously is unavoidable.

Accordingly, the present invention provides a low power consumption GNSS receiver by adaptively adjusting clock frequency and method thereof.

SUMMARY OF THE INVENTION

To solve the foregoing drawbacks in the prior art, it is an objective of the present invention to provide a low power consumption GNSS receiver by adaptively adjusting clock frequency and method thereof.

The low power consumption GNSS receiver of the present invention comprises a correlator, a DSP (Digital signal processor) and a microprocessor. The correlator of the GNSS receiver performs correlations to signals received from channels with a correlator clock frequency. The DSP controls the correlator clock frequency according to the correlator load to perform correlations. The DSP decodes transmission data from satellites and calculates code phases and Doppler frequencies for the signals from the channels in turn with a DSP clock frequency. The DSP controls the DSP clock frequency according to an accumulated throughput of calculation or a predetermined threshold number of channels. The microprocessor processes a measurement result from the DSP to obtain user position, velocity and time information with a microprocessor clock frequency. The microprocessor controls the microprocessor clock frequency according to an accumulated progress of processing the measurement and its original job to meet limited timing criterion.

The present invention also provides a method to achieve low power consumption of a GNSS receiver. The method comprises steps below:

Performing correlations to a plurality of signals received from a plurality of channels with a correlator clock frequency; and Controlling the correlator clock frequency according to a correlator load to perform correlations.

The method of the present invention further comprises a step of calculating code phases and Doppler frequencies for the signals from the channels in turn with a DSP clock frequency. The method further comprises a step of controlling the DSP clock frequency according to an accumulated throughput of calculation for the code phases and the Doppler frequencies or according to a predetermined threshold number of channels during the step of calculating code phases and Doppler frequencies.

The method of the present invention further comprises a step of processing a measurement result of the calculation and the adjustment for the code phases and the Doppler frequencies from the DSP for obtaining position information with a microprocessor clock frequency. The method further comprises a step of controlling the microprocessor clock frequency according to an accumulated progress of processing the measurement result during the step of processing the measurement result.

BRIEF DESCRIPTION OF THE DRAWINGS

The foregoing aspects and many of the attendant advantages of this invention will become more readily appreciated as the same becomes better understood by referencing the following detailed descriptions, when taken in conjunction with the accompanying drawings, wherein:

FIG. 2A shows a timing diagram of ticks at DSP side for calculating and adjusting code phase and Doppler frequencies for signals from channels according to the present invention;

FIG. 2B shows a timing diagram of an accumulated throughput of the DSP corresponding to the ticks of performing calculating and adjusting code phase and Doppler frequencies for the signals shown in FIG. 2A;

DETAILED DESCRIPTION OF THE INVENTION

Figure 1:
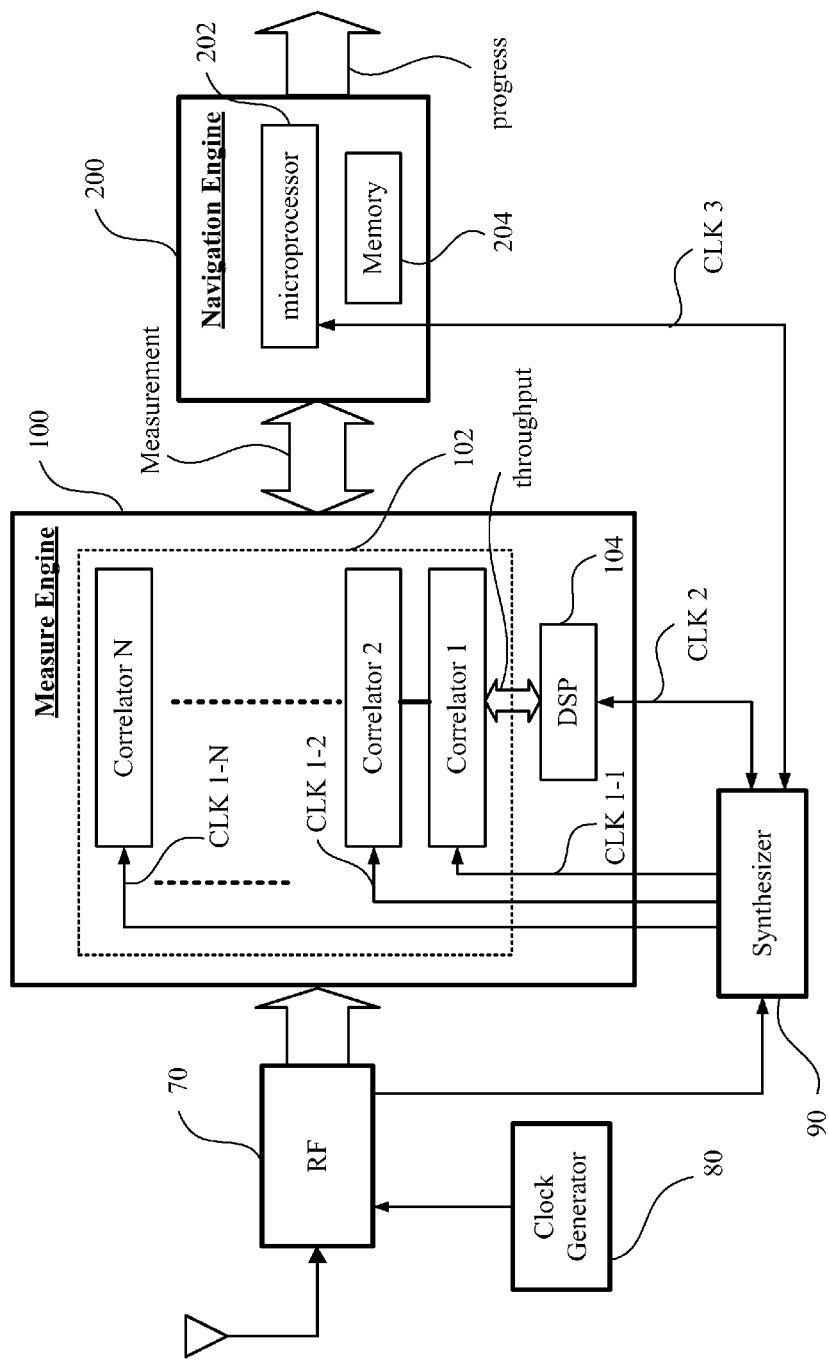
FIG. 1 illustrates a block diagram showing a GNSS receiver according to the present invention.

Please refer to FIG. 1, which illustrates a block diagram showing a GNSS receiver according to the present invention. The GNSS receiver comprises an RF unit 70, a clock generator 80, a synthesizer 90, a measure engine 100 and a navigation engine 200. The measure engine 100 comprises a correlator 102 and a DSP 104. The navigation engine 200 comprises a microprocessor 202 and a memory 204. For a stand-alone GNSS receiver, such as a mobile navigation device set up in a car, the navigation engine 200 can embedded in a chipset solution of the GNS receiver. For a host based solution, such as a navigation system installed in a notebook, the navigation engine 200 can be implemented by software in a host CPU. The RF unit 70 receives a plurality of signals from satellites in the sky through a plurality of channels. The clock generator 80 generates a reference clock. The synthesizer 90 provides CLK 1 (correlator clock), CLK 2 (DSP clock) and CLK 3 (microprocessor clock) to the correlator 102, the DSP 104 and microprocessor 202, respectively based on the reference clock. In one case, the correlator 102 can be implemented by a plurality of sub-correlators, and the synthesizer 90 correspondingly provides respective correlator clocks (CLK 1-1, CLK 1-2 . . . and CLK 1-N) correlator 1, correlator 2 . . . and correlator N thereto.

The DSP 104 controls the correlator clock of the correlator 102 and the DSP clock adaptively. The microprocessor 202 controls the microprocessor clock adaptively. The correlator 102 performs correlations to the signals received through the channels with a correlator clock frequency of CLK 1. The DSP 104 controls the correlator clock frequency according to a correlator load to perform correlations. The correlator load depends on the number of correlations those are actually necessary in searching or tracking satellites. That is, the hardware architecture of the GNSS receiver allows to speeds up searching by using a higher correlator clock frequency. When the satellite is tracked or the search range is small, the correlator clock frequency can be slower for better power saving. That is, the correlator load is highly proportional to the satellite number and the search range. Meanwhile, the correlator load also depends on area of code-frequency domains for searching or tracking the signals. Then, the DSP 104 calculates and adjusts code phases and Doppler frequencies for the signals from the channels in turn with a DSP clock frequency of CLK 2 and controls the DSP clock frequency according to an accumulated throughput of calculation for the code phases and the Doppler frequencies or a predetermined threshold number of channels. The microprocessor 202 processes a measurement result of the calculation and the adjustment for the code phases and the Doppler frequencies from the DSP 104 of the measure engine 100. The microprocessor 202 processes the measurement result for obtaining position information. The microprocessor 202 processes the aforesaid measurement result with a microprocessor clock frequency of CLK 3 and controls the microprocessor clock frequency according to an accumulated progress of processing the measurement result.

Please refer to FIG. 2A and FIG. 2B. FIG. 2A shows a timing diagram of ticks for calculating and adjusting code phase and Doppler frequencies from channels of the correlator 102. FIG. 2B shows an accumulated throughput or software loading of the calculation and the adjustment corresponding to the ticks for performing correlations in 1 ms shown in FIG. 2A according to the present invention. The GNSS receiver receives a plurality of signals from channel 1 to channel N. Transmission distance is different for each satellite to the GNSS receiver. Therefore, searching and tracking different satellite is usually asynchronous because an optimal integration window of each satellite may be asynchronous and different from others. In FIG. 2A, a circle marked on that channel means the channel just finishes one integration window and it needs DSP 104 service of the calculating and adjusting code phase and Doppler frequencies for the channel at that single ms. As a broken-line block in FIG. 2A, the DSP 104 has to complete the service for almost 90% of the total channels in one millisecond. The calculation and adjustment throughput, or loading of the DSP 104, is large during that millisecond as shown in FIG. 2B.

Figure 3:
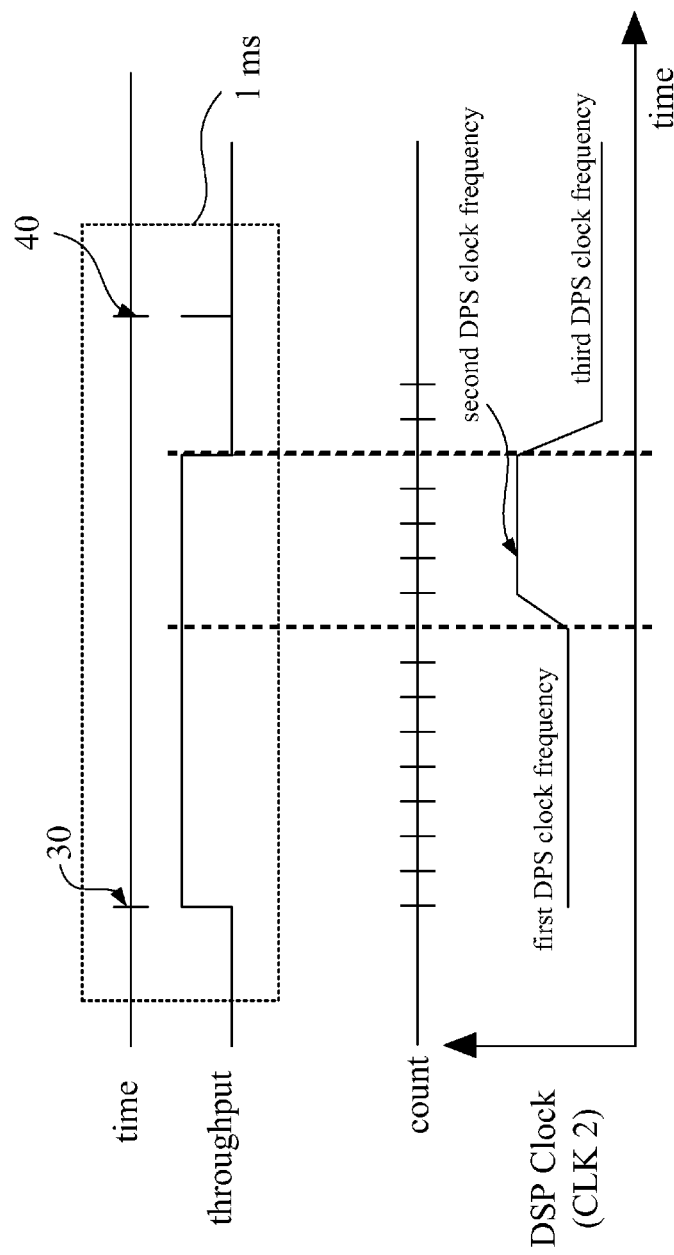
FIG. 3 shows a detail partial timing diagram of the accumulated throughput of calculation and adjustment for the signals from channels in one millisecond in FIG. 2B and how the DSP clock frequency is adjusted correspondingly according to the present invention.
Figure 8:
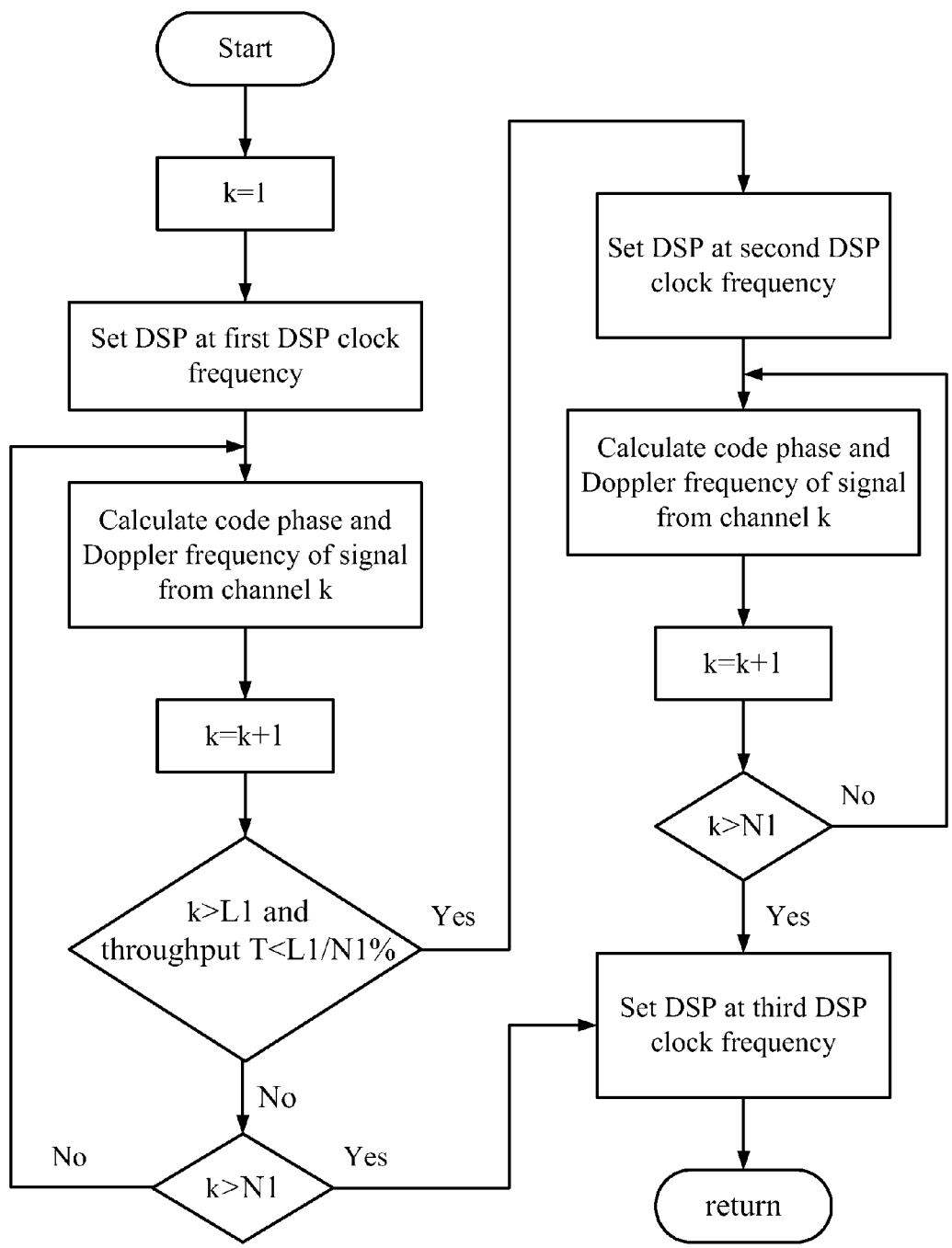
FIG. 8 illustrates a flowchart of a method adaptively to achieve low power consumption for a GNSS receiver by adjusting DSP clock frequency or microprocessor clock frequency according to a second embodiment of the present invention.
Figure 10:
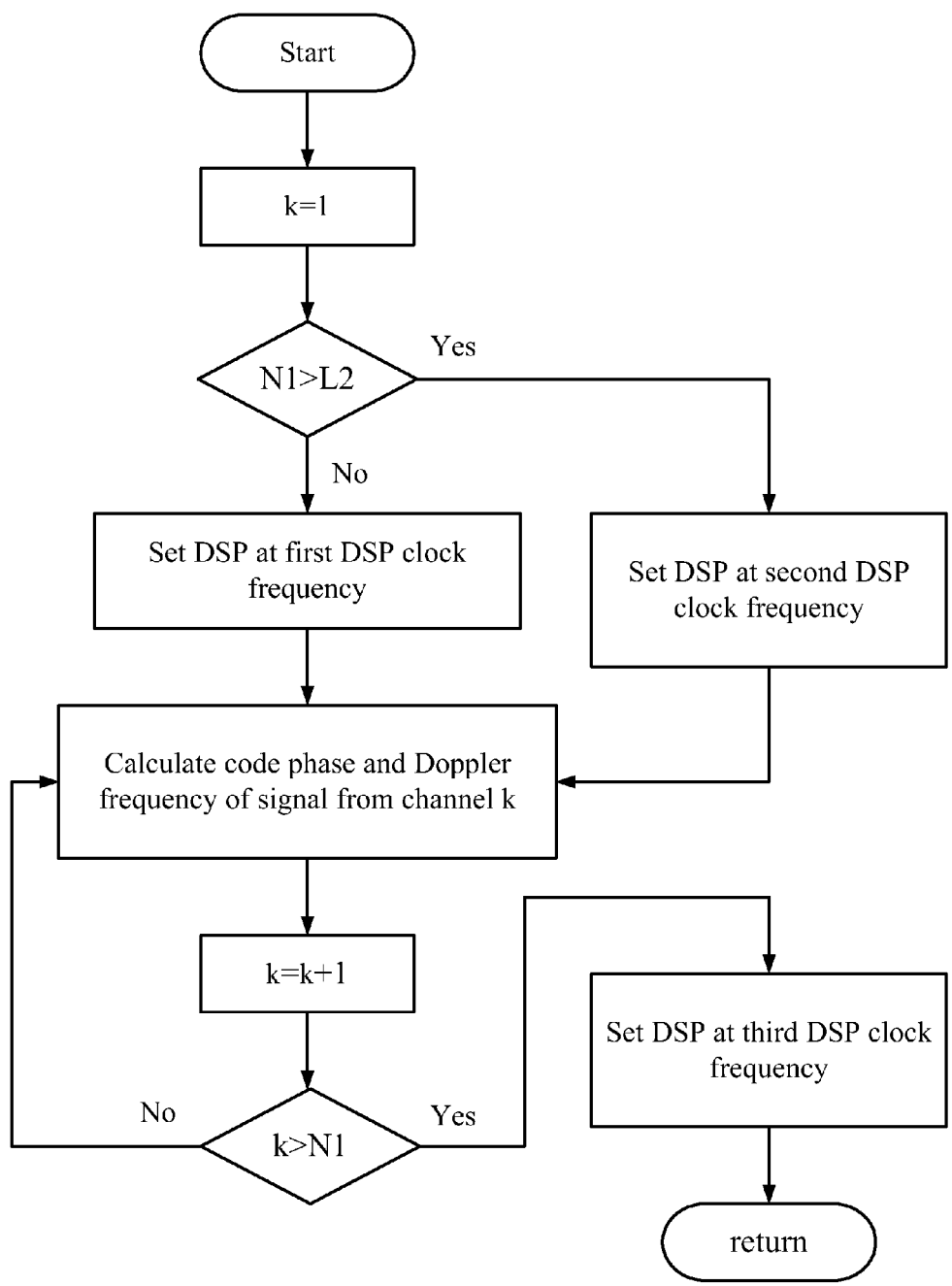
FIG. 10 illustrates a flowchart of a method to achieve low power consumption for a GNSS receiver by adaptively adjusting DSP clock frequency or microprocessor clock frequency according to a third embodiment of the present invention.

Then, refer to FIG. 3, a detail diagram of the 1 millisecond broken-line block shown in FIG. 2A and FIG. 2B, the DSP 104 automatically adjusts its operation clock frequency by using a method shown in FIG. 8 or FIG. 10 to meet the requirement of finishing all calculation and adjustment for all channels before the next ms time tick. If everything goes well, the DSP 104 transmits a measurement result of the calculation and the adjustment for the code phase and the Doppler frequency of each satellite to the navigation engine 200 usually in 1 second. Therefore, the user's position, velocity and time information can be obtained from the navigation engine 200.

FIG. 3 shows a detailed partial timing diagram of the DSP throughput handling in one millisecond. A hardware counter is suggested to indicate the accumulated throughput or the software loading as counts shown in FIG. 3 when using the method of adjusting DSP clock frequency shown in FIG. 8 (which is introduced later). However, in case of the method of adjusting DSP clock frequency shown in FIG. 10 (which is also introduced later), aforesaid hardware counter can be omitted.

To complete the calculation and adjustment for all the code phases and Doppler frequencies for all the signals in one millisecond, the DSP 104 calculates and adjusts the code phases and the Doppler frequencies for the signals with a first DSP clock frequency in the beginning, and then raises the DSP clock to a second DSP clock frequency to speed up the calculation if an accumulated throughput of calculation and adjustment for the code phases and the Doppler frequencies lags behind a ratio of a predetermined channel number to a number of total channels. After finishing the calculation and adjustment for all the signals, lower the DSP clock to a third DSP clock frequency, which is lower than the first and second DSP clock frequencies to reduce power consumption. Accordingly, the present invention not only can complete the calculation and adjustment for all the code phases and Doppler frequencies for all the signals in one millisecond but also reduce power consumption for a GNSS receiver. More details about how to adjust the DSP clock frequency will be introduced with reference to FIG. 8 to FIG. 11 later.

Figure 4A:
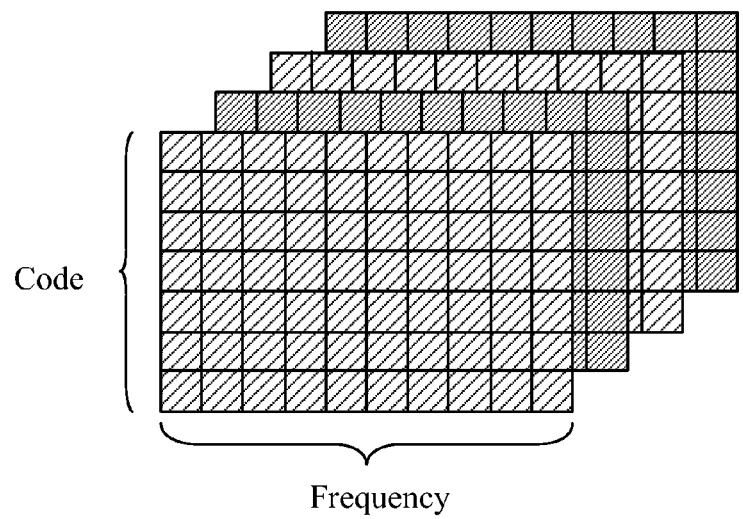
FIG. 4A, FIG. 4B and FIG. 4C illustrate code-frequency domain diagrams showing three different ranges of searching or track states according to the present invention.
Figure 4B:
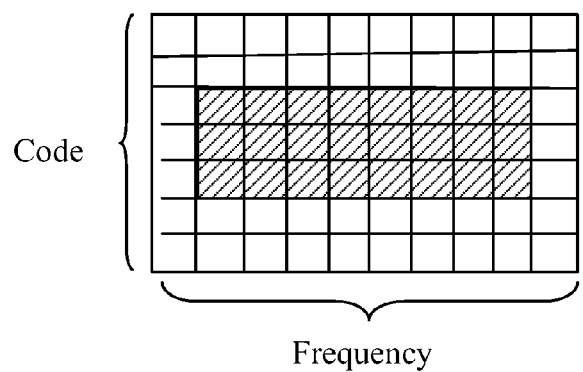
Figure 4C:
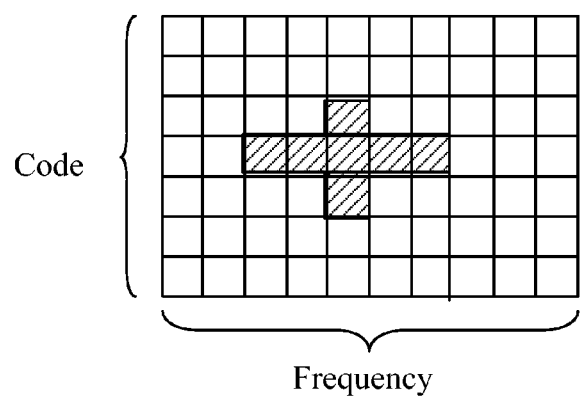
Figure 5:
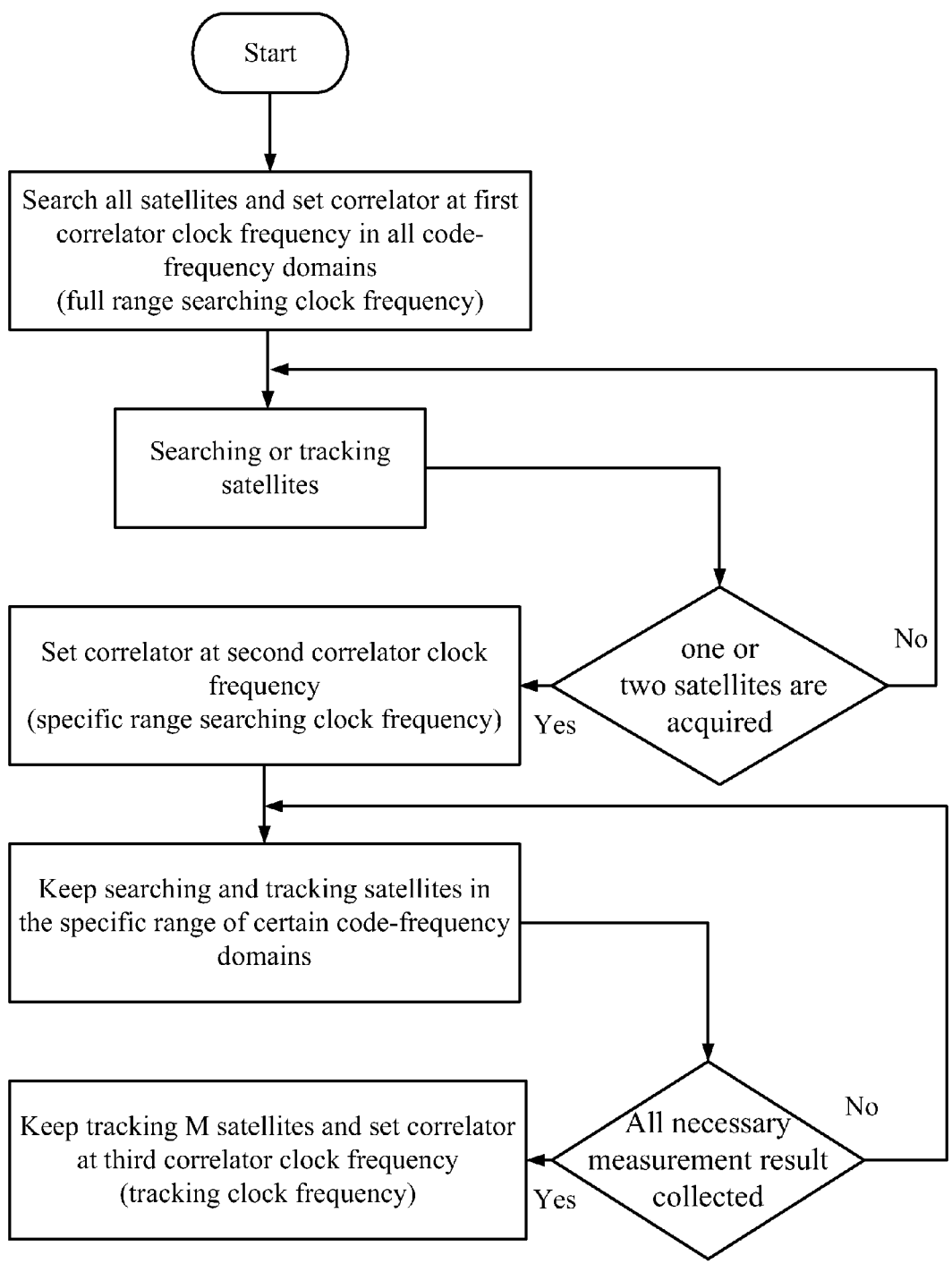
FIG. 5 shows a flowchart of a method for adaptively adjusting correlator clock frequency to achieve low power consumption for a GNSS receiver according to first embodiment of the present invention.
Figure 6:
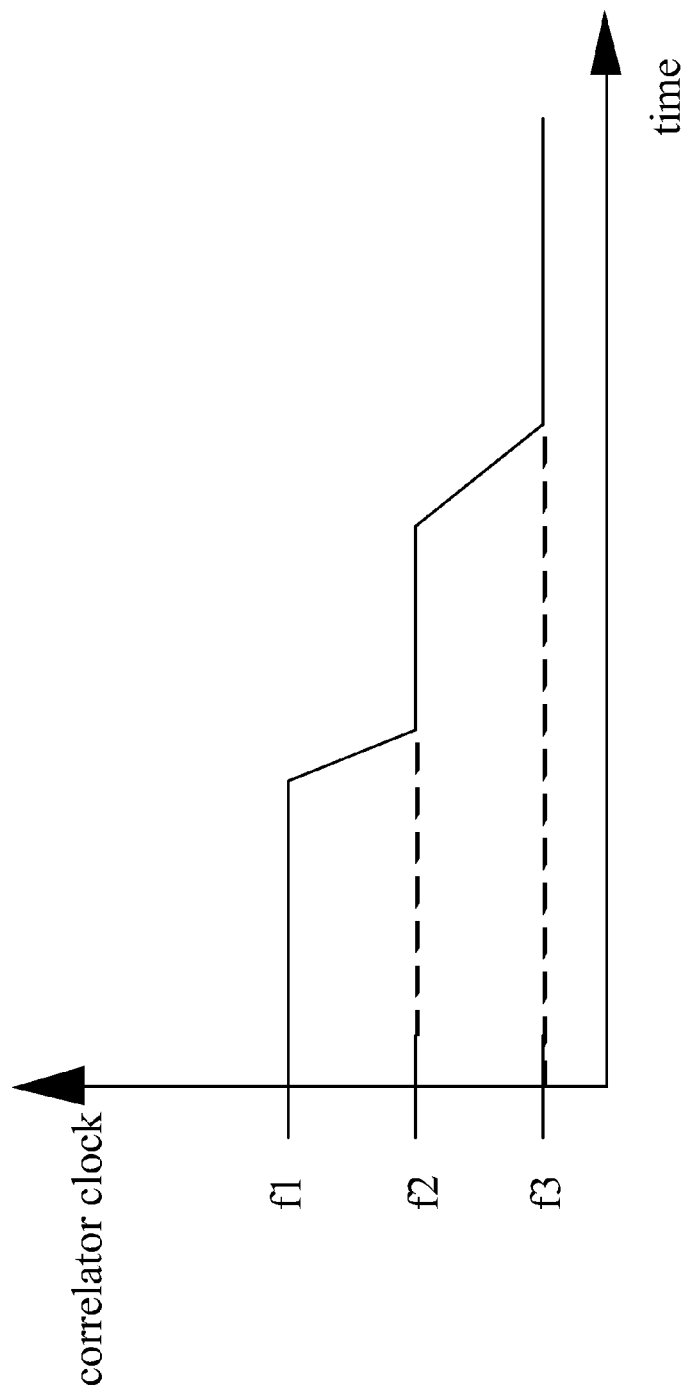
FIG. 6 is a diagram showing relationship between time and correlator clock frequency adjusted according to the method shown in FIG. 5.

Please refer to FIG. 4A, FIG. 4B and FIG. 4C together with FIG. 5 and FIG. 6. FIG. 4A, FIG. 4B and FIG. 4C illustrate three code-frequency domain diagrams showing three different searching or tracking ranges. FIG. 5 shows a flowchart of a method of adaptively adjusting correlator clock frequency according to the three different searching or tracking ranges shown in FIG. 4 to achieve low power consumption for a GNSS receiver according to first embodiment of the present invention. FIG. 6 is a diagram showing relationship between time and correlator clock frequency corresponding to the method shown in FIG. 5.

Because the number of the available satellites may change from case to case, searching or tracking ranges of the code-frequency domains will also change after one or two satellites are acquired or after obtaining position information. The number of the channels that the correlator 102 performs correlations to the signals therethrough may also change often. For example, signals from line of sight satellites may be relatively stronger than signals from multi-path or blocking satellites. The GNSS receiver can simultaneously track several satellites. To track satellites of which signals are weak usually consumes more power than to track satellites of which signal are strong because tracking satellites of which signals are weak needs a bigger integration window for dispreading signals. If strong signals are enough for navigation fix, the correlator 102 may not need to perform correlations to the signals from satellites of which signals are weak temporarily. Alternatively, the correlator 102 may stop performing correlations to the strong signals by using extrapolation to predict the correlation results temporarily and keeps performing correlations to other signals, which are weak and integration period of correlation exceed 1 second to collect all necessary data. Therefore, the number of the channels that the correlator performs correlations to the signals received therethrough changes. After one or two satellites are acquired or after the position information is obtained, the range of code-frequency domains for searching can be greatly reduced. As well known, the power consumption is proportional to the correlator clock frequency (also proportional to DSP clock frequency and microprocessor clock frequency which are mentioned later), and the simultaneous searching capability is proportional to the correlator clock frequency in the present invention. According to prior arts, the correlator clock frequency keeps the same But the present invention adjusts the correlator clock frequency correspondingly to the number of the channels or the search range or tracking ranges of the code-frequency domains that the correlator 102 performs correlations to the signals therethrough. Accordingly, the present invention can efficiently reduce power consumption for a GNSS receiver.

For example, it is assumed that the number of available satellites is M (same as in FIG. 5), then the GNSS receiver is powered on in a higher correlator clock frequency and tries to locate the current position as quick as possible in the beginning. Meanwhile, the search range on code-frequency domains of the M satellites is large either. An example of this case is the "cold start". Therefore, the GNSS receiver starts at a full range searching state for all code-frequency domains as shown in FIG. 4A in order to find any possible satellites in the sky as soon as possible. The DSP 104 sets the correlator 102 at a first correlator clock frequency, $f_1$ which is the highest as shown in FIG. 6 because the correlator 102 needs to perform correlations to the signals received through all channels.

After a certain period of searching and tracking is passed, one or more satellites are acquired or even a first positioning point is obtained, the search range of other GNSS satellites can be transformed into a specific range of searching which reduces the correlators load greatly as shown in FIG. 4B. The DSP 104 sets the correlator 102 at a second correlator clock frequency, $f_2$ which is a comparatively middle frequency as shown in FIG. 6. Because with the obtained first positioning point or with the information of on or two satellites, the number of channels that the correlator 102 performs correlations to the signals therethrough can be decreased and the range of code-frequency domains for searching also can be further reduced. After searching and tracking satellites in specific range of certain code-frequency domains and after all necessary data is collected, the GNSS receiver is transformed into a tacking state for a even smaller range of code-frequency domains as shown in FIG. 4C for only tracking the available M satellites. The DSP 104 sets the correlator 102 at a third correlator clock frequency, $f_3$ which is lower than the first and the second correlator clock frequencies because the correlator only needs to perform correlations to the signals due to tracking the M satellites for keeping to obtain position information of the GNSS receiver from the M satellites.

Figure 7A:
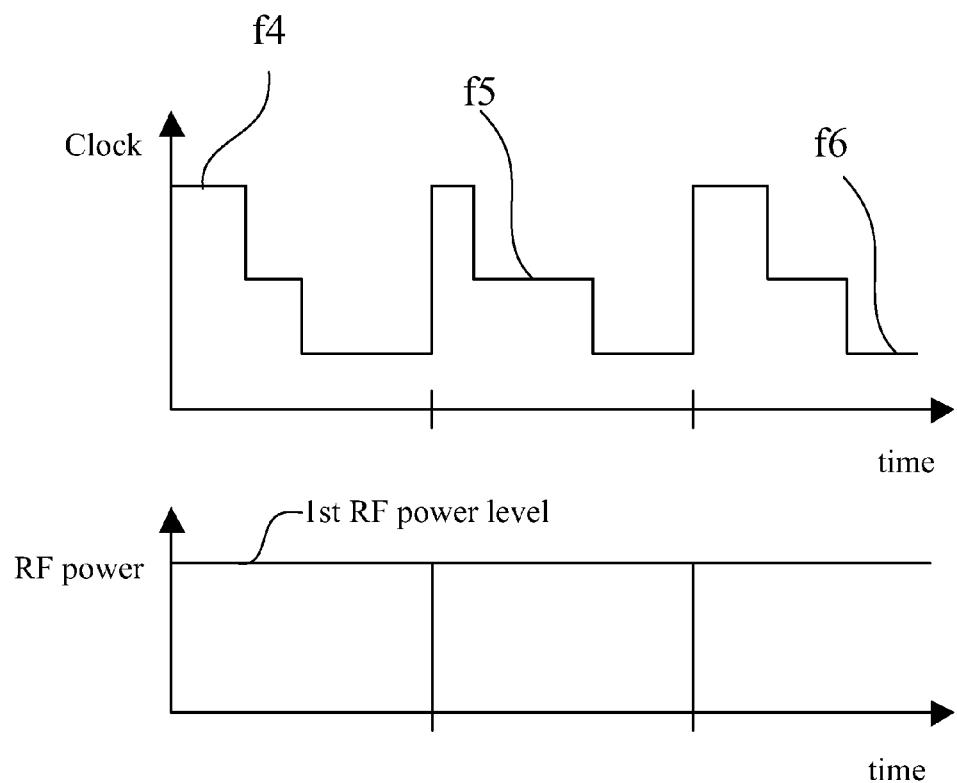
FIG. 7A and FIG. 7B show relationship between RF power and the correlator clock frequency according to the present invention.
Figure 7B:
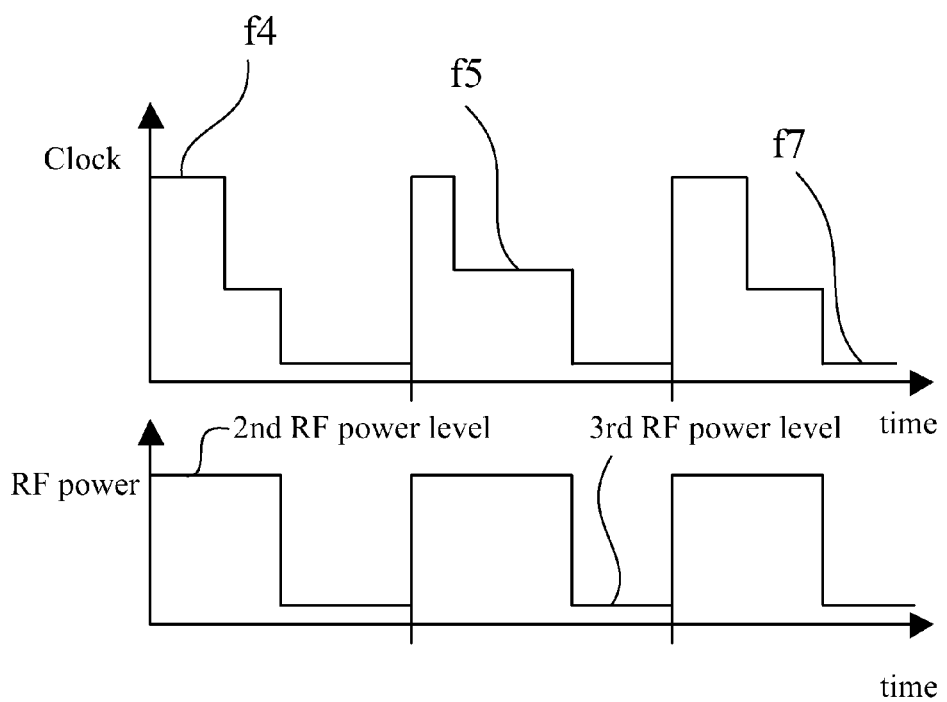

Please refer to FIG. 7A and FIG. 7B. FIG. 7A and FIG. 7B show relationship between RF power of the GNSS receiver and the correlator clock frequency along 1 second time axis according to the present invention. At RF stage, all satellites signal are spreading and merged in application bandwidth. The RF power is usually proportional to the actual working load of correlators. That is, if all satellites signal are strong and stable, the RF power can be reduced because there is no integration window longer than 1 second. An example of this case can be seen in FIG. 7B. Therefore, to adaptively adjust RF power according to the correlator searching or the tracking condition can reduce the RF power consumption correspondingly. Besides, in a proposed RF front end design, current setting to its LNA (low noise amplifier) can be configurable for different NF (noise figure) requirements. For strong satellites receiving condition, lower LNA current is required for acceptable NF. But for indoor condition or dense urban receiving condition, higher LNA current is usually required for a better performance. In FIG. 7A, the DSP 104 sets the correlator 102 at a higher correlator clock frequency, $f_4$ which is comparatively high in the beginning for handling multiple satellites correlations simultaneously. Then, the DSP 104 sets the correlator 102 at a lower correlator clock frequency, $f_5$ which is a comparatively middle frequency after stopping correlation to strong satellite signals which only require small integration windows. And then, the DSP 104 sets the correlator 102 at an even lower correlator clock frequency, $f_6$ because the correlator 102 only needs to perform correlations for a small percentage of satellites those require longer integration windows. Accordingly, in FIG. 7A, correlator consumption power can be reduced in a similar way as aforementioned in FIG. 4-6. However, the RF power consumption of the GNSS receiver can not be reduced in FIG. 7A and the RF power is kept at a first RF power level because one of more satellites need longer integration window which may be longer than 1 second in some cases. But in FIG. 7B, during the period that correlator clock is set at $f_4$ and $f_5$, the RF power is maintained at a second RF power level. Then, when satellite receiving condition is good and no signal correlation is needed, a lowest correlator clock, $f_7$ is applied to maintain the operation of NCO (numerical control oscillator) of the correlators. Such a NCO design can be usually found in correlators as code wipe off NCO or Doppler wipe off NCO. Therefore, since there is no need of correlation in time period of $f_7$, the RF power can be reduced for better power saving performance.

Furthermore, it is still assumed that the number of available satellites is M. According to another embodiment of adjusting the correlator clock frequency in the present invention, in the beginning, the GNSS receiver starts a big range of searching for all code-frequency domains as shown in FIG. 4A to find any possible satellites in the sky as sooner as possible. The DSP 104 sets the correlator 102 at a first correlator clock frequency which is highest as shown in FIG. 6, because the correlator 102 needs to perform correlations of the big range of searching to the signals received through all channels. After a certain period of searching and tracking is passed, after one or two satellites are acquired, and then the GNSS receiver can be transformed into a specific range of searching for specific area of certain code-frequency domains. The correlator 102 may stop performing correlations to the signals received from some satellites. Because the signals received from these satellites are stronger and more stable), therefore, the DSP 104 predicts the correlation results of the signals from these satellites after a period temporarily by extrapolation. The correlator 102 may only keep performing correlations to other signals, which are weak and the integration periods of correlation exceed several seconds to collect all necessary measurement result from these satellites. Similarly, the DSP 104 sets the correlator 102 at a second correlator clock frequency which is a comparatively middle frequency because the correlator 102 only performs correlations at specific range of satellites. The DSP 104 continues to set the correlator 102 at a third correlator clock frequency which is even lower than the first and the second correlator clock frequency because the correlator 102 only needs to perform correlations to the signals received from M satellites for keeping to obtain navigation information (aforesaid user's position, velocity and time information and etc.). Accordingly, with another aspect of this invention, the RF power consumption of the proposed GNSS receiver can also be reduced at conditions of outdoor receiving that no satellite needs integration window of correlation longer than 1 second. A low power consumption GNSS receiver can be realized.

Alternatively, after navigation fix is obtained, and range of correlation of satellites is minimized. If the GNSS receiver stops trying to locate the current position, the correlator 102 may be set at a lowest correlator clock, $f_7$ which is its basic reference clock. The basic reference clock is the clock directly from clock generator 80, to maintain the extrapolation of the minimized search range.

Figure 9:
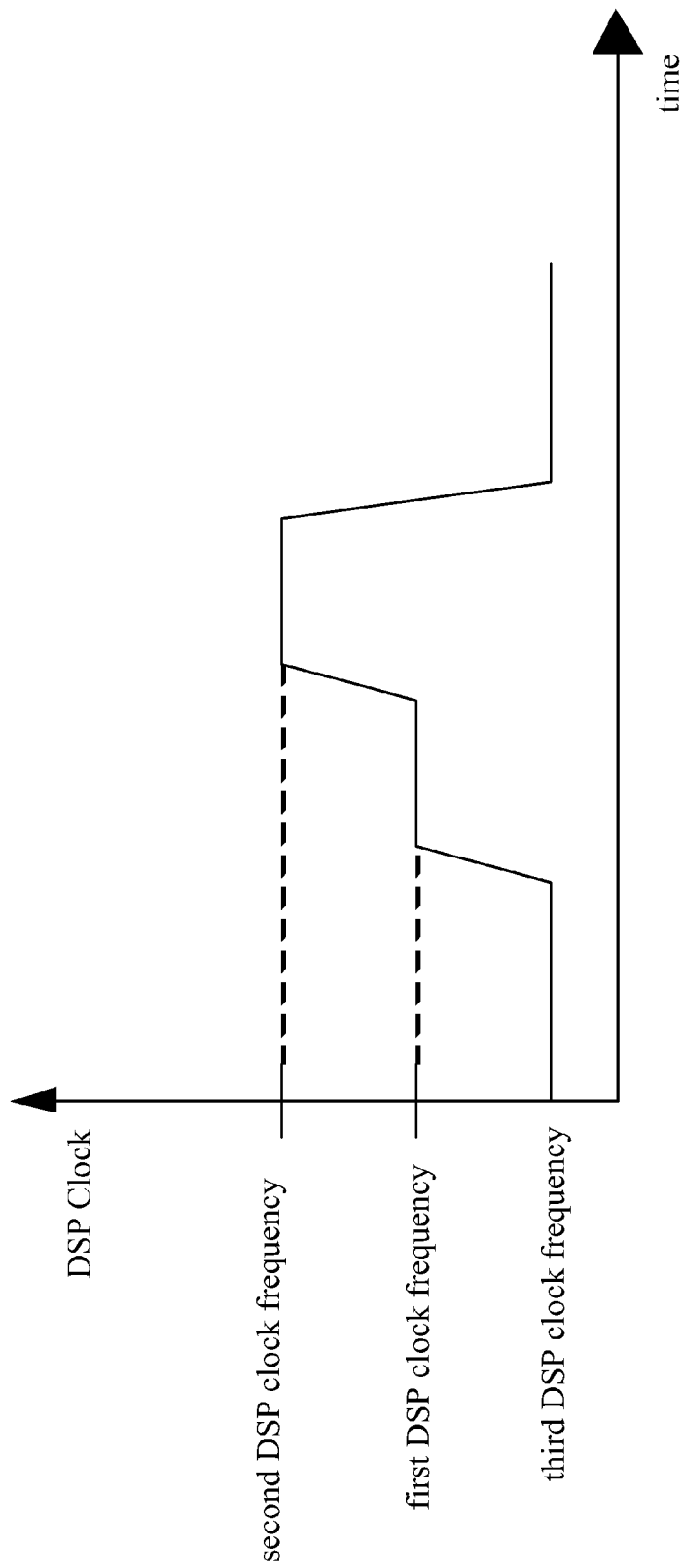
FIG. 9 is a diagram showing relationship between time and DSP clock frequency or microprocessor clock frequency adjusted according to the method shown in FIG. 8.

Please refer to FIG. 8 with FIG. 9. FIG. 8 illustrates a flowchart of a method to achieve low power consumption for a GNSS receiver by adaptively adjusting DSP clock frequency according to second embodiment of the present invention. FIG. 9 is a diagram showing relationship between time and DSP clock frequency corresponding to the method shown in FIG. 8. N1 means a number of total channels and L1 represent a predetermined channel number. k is the index of the channels. The DSP 104 set k=1 and the DSP 104 at a first DSP clock frequency as shown in FIG. 9. The DSP 104 starts to calculate and adjust the code phases and the Doppler frequencies for the signals from the N1 channels in turn of k in the beginning. A proposed method and software architecture of this invention suggests the DSP or CPU should monitor its throughput in during processing each channels. If the accumulated throughput lags behind a ratio of the predetermined channel number to the number of total channels, that is, k>L1 and the accumulated throughput T<L1/N1%, the DSP 104 raises the DSP clock to a second DSP clock frequency as shown in FIG. 9 to speed up the calculation and adjustment. If the accumulated throughput does not lag behind, the DSP keeps calculate the code phases and the Doppler frequencies of the signals from the N1 channels with the first DSP clock frequency or drops the DSP clock to a third DSP clock frequency directly to lower down the power consumption. If k>N1 (calculation for the all channels is completed), the DSP 104 changes clock frequency of the DSP clock to the third DSP clock frequency, which is comparatively low after the calculation and the adjustment for all the channels is completed as shown in FIG. 9.

Similarly, the microprocessor 202 also can adjust a microprocessor clock frequency thereof as the aforesaid method of adaptively adjusting DSP clock frequency as shown in FIG. 8 and FIG. 9. The microprocessor 202 processes a measurement result of the calculation and the adjustment for the code phases and the Doppler frequencies from the DSP 104 for obtaining position information for the GNSS receiver with the microprocessor clock frequency. The microprocessor 202 controls the microprocessor clock frequency according to an accumulated progress of processing the measurement result. The microprocessor 202 starts to process the measurement result with a first microprocessor clock frequency in the beginning.

In the present invention, it is suggested that the microprocessor 202 should check the accumulated progress of processing the measurement result. If the accumulated progress lags behind a ratio of the predetermined period to a period for processing the measurement result of total channels, the microprocessor 202 raises the microprocessor clock to a second microprocessor clock frequency which is comparatively high to speed up the progress. If the accumulated progress does not lag behind, the microprocessor 202 keeps processing the calculation and adjustment result with the first microprocessor clock frequency. If the progress of processing the measurement result for total channels is completed, the microprocessor sets the microprocessor clock frequency at a third microprocessor clock frequency which is comparatively low to reduce power consumption of the GNSS receiver.

As a common rule of most GNSS receivers, the microprocessor 202 of the navigation engine 200 processes the measurement result received from the DSP 104 to provide position, velocity and time information for a user of the GNSS receiver by indicating the current location every second. Adjusting the microprocessor clock frequency adaptively according to the accumulated progress also can do contribution to reduce power consumption for the GNSS receiver similarly as described about adaptively adjusting the DSP clock frequency.

Figure 11:
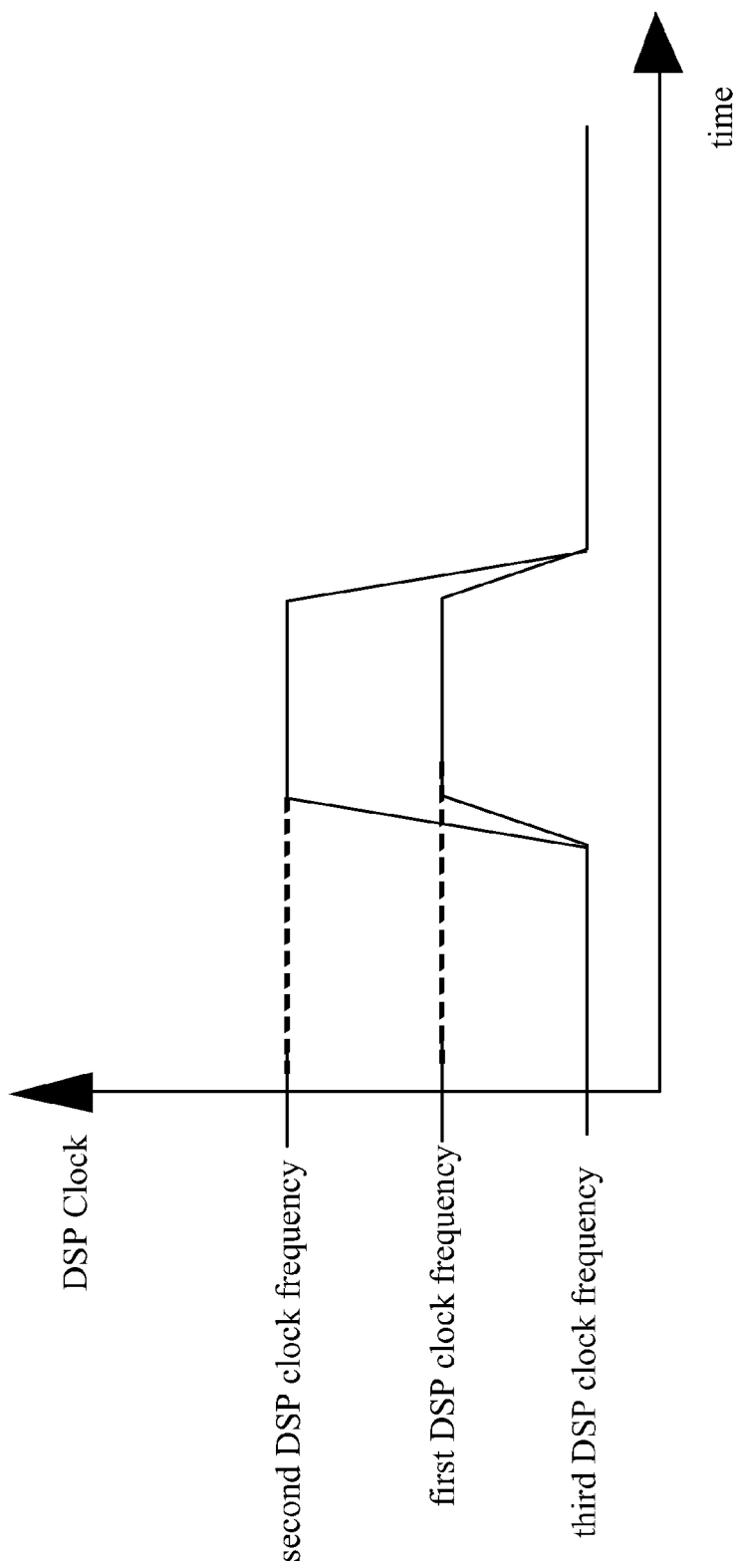
FIG. 11 is a diagram showing relationship between time and DSP clock frequency or microprocessor clock frequency adjusted according to the method shown in FIG. 10.

Please refer to FIG. 10 with FIG. 11. FIG. 10 illustrates a flowchart of a method to achieve low power consumption for a GNSS receiver by adaptively adjusting DSP clock frequency according to a third embodiment of the present invention. FIG. 11 is a diagram showing relationship between time and DSP clock frequency corresponding to the method shown in FIG. 10. N1 means the number of total channels and L2 represent a predetermined threshold number of channels. k is the index of the channels. First, the DSP 104 compares the number of all channels that the correlator 102 is going to have its Doppler and code phase frequencies going to be calculated and adjusted by DSP 104 with the predetermined threshold number of channels, L2.

If the number of the total channels is smaller than L2, the DSP 104 starts to calculate the code phases and the Doppler frequencies for the signals from the all channels in turn with a first DSP clock frequency which is comparatively low to reduce power consumption of the GNSS receiver.

If the number of total channels is larger than L2, the DSP 104 raises the DSP clock frequency and starts to calculate the code phases and the Doppler frequencies for the signals in turn with a second DSP clock frequency which is higher than the first DSP clock frequency for completing calculation in a limited timing window of one millisecond. Then, the DSP clock is changed to a third DSP clock frequency which can be a basic reference clock frequency directly from clock generator 80 which is much lower than the first and second DSP clock frequencies after the measurement of the calculation and adjustment for the all channels is completed. Similarly, the microprocessor 202 also can adjust a microprocessor clock frequency thereof as the aforesaid method of adaptively adjusting DSP clock frequency as shown in FIG. 10 and FIG. 11.

According to the GNSS receiver of the present invention and method thereof, by adaptively adjusting correlator clock frequency, DSP clock frequency, the microprocessor clock frequency and RF power, achieving low power consumption for the GNSS receiver can be realized.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A low power consumption GNSS receiver receiving a plurality of signals from a plurality of channels, the GNSS receiver comprising:

a correlator, performing correlations to the signals from the channels with a correlator clock frequency; and a DSP, controlling the correlator clock frequency according to a correlator load to perform correlations;

calculating and adjusting code phases and Doppler frequencies for the signals from the channels in turn with a DSP clock frequency;

controlling the DSP clock frequency according to an accumulated throughput of calculation and adjustment for the code phase and the Doppler frequencies;

raising the DSP clock frequency if the accumulated throughput lags behind a ratio of a predeteremined channel number to a number of total channels after calculating and adjusting for the signals from the channels of the predetermined number.

2. The GNSS receiver of claim 1, wherein the correlator load depends on the number of the channels that the correlator performs correlation to the signals therethrough.

3. The GNSS receiver of claim 1, wherein the correlator load depends on range of code-frequency domains for searching or tracking the signals.

4. The GNSS receiver of claim 1, wherein the DSP lowers the correlator clock frequency after obtaining position information.

5. The GNSS receiver of claim 1, wherein the DSP lowers the correlator clock frequency after one satellite is acquired.

6. A low power consumption GNSS receiver receiving a plurality of signals from a plurality of channels, the GNSS receiver comprising:

a correlator, performing correlations to the signals from the channels with a correlator clock frequency;

a DSP, controlling the correlator clock frequency according to a correlator load to perform correlations, and calculating and adjusting code phases and Doppler frequencies for the signals from the channels in turn with a DSP clock frequency; and a microprocessor, processing a measurement result of the calculation and the adjustment for the code phase and the Doppler frequencies from the DSP for obtaining position information with a microprocessor clock frequency, controlling the microprocessor clock frequency according to an accumulated progress of processing the measurement result, and raising the microprocessor clock frequency if the accumulated progress lags behind a ratio of the predetermined period to a period for processing the measurement result of total channels after processing the measurement result of the predetermined period.

7. A method to achieve low power consumption for a GNSS receiver, the method comprising steps of:

performing correlations to a plurality of signals received from a plurality of channels with a correlator clock frequency;

controlling the correlator clock frequency according to a correlator load to perform correlations;

calculating and adjusting code phases and Doppler frequencies for the signals from the channels in turn with a DSP clock;

controlling the DSP clock frequency according to an accumulated throughput of calculation and adjustment for the code phase and the Doppler frequencies during the step of calculating and adjusting code phase and Doppler frequencies; and raising the DSP clock frequency if the accumulated throughput lags behind a ratio of a predetermined channel number to a number of total channels after calculating and adjusting for the signals from the channels of the predetermined number during the controlling step.

8. The method of claim 7, further comprising a step of lowering the correlator clock frequency after obtaining position information.

9. The method of claim 7, further comprising a step of lowering the correlator clock frequency after one satellite is acquired during the controlling step.

10. A method to achieve low power consumption for a GNSS receiver, the method comprising steps of:
performing correlation to a correlator to perform correlations;
controlling the correlator frequency according to a correlator load to perform correlations;
calculating and adjusting code phases and Doppler frequencies for the signals from the channels in turn with a DSP clock frequency;
processing a measurement result of the calculation and the adjustment for the code phases and the Doppler frequencies from the DSP for obtaining position information with a microprocessor clock frequency after the step of calculating and adjusting code phases and Doppler frequencies;
controlling the microprocessor clock frequency according to an accumulated progress of processing the measurement result during the step of processing the measurement; and
raising the microprocessor clock frequency if the accumulated progress lags behind a ratio of the predetermined period to a period for processing the measurement result of total channels after processing the measurement result of the predetermined period during the controlling step.

* * * * *